(12) United States Patent
Staun

(10) Patent No.: US 12,171,369 B2
(45) Date of Patent: Dec. 24, 2024

(54) AIR FRYER COOKING APPLIANCE

(71) Applicant: Midea Group Co., Ltd., Foshan (CN)

(72) Inventor: Paul R. Staun, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 434 days.

(21) Appl. No.: 17/091,532

(22) Filed: Nov. 6, 2020

(65) Prior Publication Data

US 2022/0142403 A1 May 12, 2022

(51) Int. Cl.
| | |
|---|---|
| A47J 37/06 | (2006.01) |
| A47J 36/06 | (2006.01) |
| A47J 36/10 | (2006.01) |
| A47J 36/20 | (2006.01) |

(52) U.S. Cl.
CPC ....... *A47J 37/0641* (2013.01); *A47J 37/0664* (2013.01); *A47J 36/06* (2013.01); *A47J 36/066* (2022.01); *A47J 36/10* (2013.01); *A47J 36/20* (2013.01); *A47J 37/0623* (2013.01)

(58) Field of Classification Search
CPC ................ A47J 37/0641; A47J 37/0664; A47J 37/0623; A47J 36/06; A47J 36/066; A47J 36/10; A47J 36/20
USPC ...................................................... 126/21 A
See application file for complete search history.

(56) References Cited

U.S. PATENT DOCUMENTS

| | | | |
|---|---|---|---|
| 4,627,334 A | 12/1986 | Shanklin | |
| 5,036,990 A | 8/1991 | Verchere | |
| 5,359,988 A * | 11/1994 | Hait | A47J 37/0704 126/153 |
| 7,237,547 B1 | 7/2007 | Bourgeois | |
| 10,051,987 B2 | 8/2018 | Bebo | |
| 10,384,868 B1 | 8/2019 | Poulopoulos | |
| 2005/0236348 A1 | 10/2005 | Killinger et al. | |
| 2019/0290062 A1 | 9/2019 | Prieto et al. | |
| 2020/0229637 A1 * | 7/2020 | Han | A47J 36/10 |
| 2021/0000296 A1 * | 1/2021 | Kennedy | A47J 27/0813 |
| 2022/0125240 A1 * | 4/2022 | McCullough | A47J 36/32 |

FOREIGN PATENT DOCUMENTS

| | | | |
|---|---|---|---|
| CN | 204133291 U | * | 2/2015 |
| CN | 106805784 A | | 6/2017 |
| GB | 900409 A | | 7/1962 |

OTHER PUBLICATIONS

CN 204133291 U—Translation (Year: 2015).*

* cited by examiner

*Primary Examiner* — Steven B McAllister
*Assistant Examiner* — Benjamin W Johnson
(74) *Attorney, Agent, or Firm* — Gray Ice Higdon

(57) ABSTRACT

A method and apparatus for an air fryer cooking appliance. The air fryer cooking appliance may include an upper body and a lower body configurable between at least one stowed position and at least one deployed position. The upper body may include a heating device and an air circulating device. The lower body may include a food container. The food container may receive the upper body in the stowed position.

22 Claims, 6 Drawing Sheets

AIR FRYER COOKING APPLIANCE

BACKGROUND

The present embodiments relate to an air fryer cooking appliance with a method and apparatus for configuring the air fryer cooking appliance between a stowed position and a deployed position.

Typical air fryers include a constant size and/or shape. This may lead to problems including, but not limited to, storing, transporting, and/or shipping of an apparatus that may have a large shape and/or outer dimension that undesirably increases the space needed for storage/shipping and/or increases transportation costs. Thus, there is a need for a compact air fryer cooking appliance for storage, shipping, carrying, etc.

SUMMARY

In some embodiments, an air fryer cooking appliance may include a housing having an upper body and a lower body. In various embodiments, the lower body may include a food container having a volume therein, and wherein the food container may be movable between a closed position and an open position different from the closed position relative to a remaining portion of the lower body. In some embodiments, the upper body may include a heating device and an air circulating device. In various embodiments, the upper body may be configurable between a stowed position and a deployed position relative to the lower body, when in the deployed position the heating device and the air circulating device may be in communication with the food container to circulate heated air within the food container of the lower body, and when in the stowed position the upper body may be positioned in a portion of the volume of the food container.

In addition, in some embodiments, when in the deployed position both the upper body and the lower body may define a heating compartment, wherein the food container may be positioned in the heating compartment. In various embodiments, when in the stowed position the upper body may be inverted in a second orientation, relative to a first orientation in the deployed position, within the volume of the food container. In some embodiments, the upper body may be in a first orientation when in both the deployed position and the stowed position within the volume of the food container. In addition, in various embodiments, the appliance may include a locking mechanism, wherein the locking mechanism may releasably secure the upper body to the lower body in the deployed position. In some embodiments, the locking mechanism may be engaged when the upper body is in the deployed position and may be disengaged when the upper body is in the stowed position. In various embodiments, the food container may include a drawer with a basket therein, when in the stowed position the upper body may be positioned within the volume of the basket of the food container.

In some embodiments, an air fryer cooking appliance may include a housing having an upper body and a lower body. In various embodiments, the lower body may include a food drawer with a basket therein, wherein the lower body may include a volume therein, and wherein the food drawer may be movable between a closed position and an open position different from the closed position relative to a remaining portion of the lower body. In some embodiments, the upper body may include a heating device and an air circulating device. In various embodiments, the upper body may be configurable between a stowed position and a deployed position relative to the lower body, when in the deployed position the heating device and the air circulating device may be in communication with the food drawer to circulate heated air within the food drawer of the lower body, and when in the stowed position the upper body may be positioned in a portion of the volume of the food drawer.

In addition, in some embodiments, the upper body may project upwardly from an upper end of the lower body when in the deployed position. In various embodiments, the appliance may include a locking mechanism, wherein the locking mechanism may releasably secure the upper body to the lower body in the deployed position, and wherein the locking mechanism may be engaged when the upper body is in the deployed position and may be disengaged when the upper body is in the stowed position. In some embodiments, when in the deployed position both the upper body and the lower body may define a heating compartment, wherein the food drawer may be positioned in the heating compartment. In addition, in some embodiments, when in the stowed position the upper body may be inverted in a second orientation, relative to a first orientation in the deployed position, within the volume of the food drawer. In various embodiments, the upper body may be in a first orientation when in both the deployed position and the stowed position within the volume of the food drawer. In some embodiments, the appliance may be operable in the deployed position and may be inoperable in the stowed position. In various embodiments, the upper body may be inserted into the volume of the food drawer only when the food drawer is in the open position.

In some embodiments, a method of operating an air fryer cooking appliance may include providing a housing having an upper body and a lower body, wherein the lower body may include a food container having a volume therein, and wherein the food container may be movable between a closed position and an open position different from the closed position relative to a remaining portion of the lower body, wherein the upper body may include a heating device and an air circulating device. In various embodiments, the method may include removing the upper body from a stowed position within a portion of the volume of the food container. In some embodiments, the method may include coupling the upper body to the lower body in a deployed position different from the stowed position. In various embodiments, the method may include circulating air and heat to the food container after coupling the upper body to the lower body in the deployed position.

In addition, in some embodiments, when in the deployed position the method may include decoupling the upper body from the lower body and inserting the upper body into the portion of the volume of the food container. In various embodiments, the method may include positioning the food container in the open position before inserting the upper body into the food container or removing the upper body from the food container. In some embodiments, the food container is in the closed position when the upper body and the lower body are in the stowed position. In various embodiments, the method of coupling may include locking the upper body to the lower body in the deployed position. Moreover, in some embodiments, the method may include inverting the upper body from one orientation in the stowed position to another orientation in the deployed position.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a residential cooking appliance such as an air fryer cooking appliance 10, 110, such as the type that may be used in single-family or multi-family dwellings, or in other similar applications. As a non-limiting example, the cooking appliance 10, 110 may be a counter-top cooking appliance having an air fryer heating compartment 40. However, it will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations.

Figure 1:
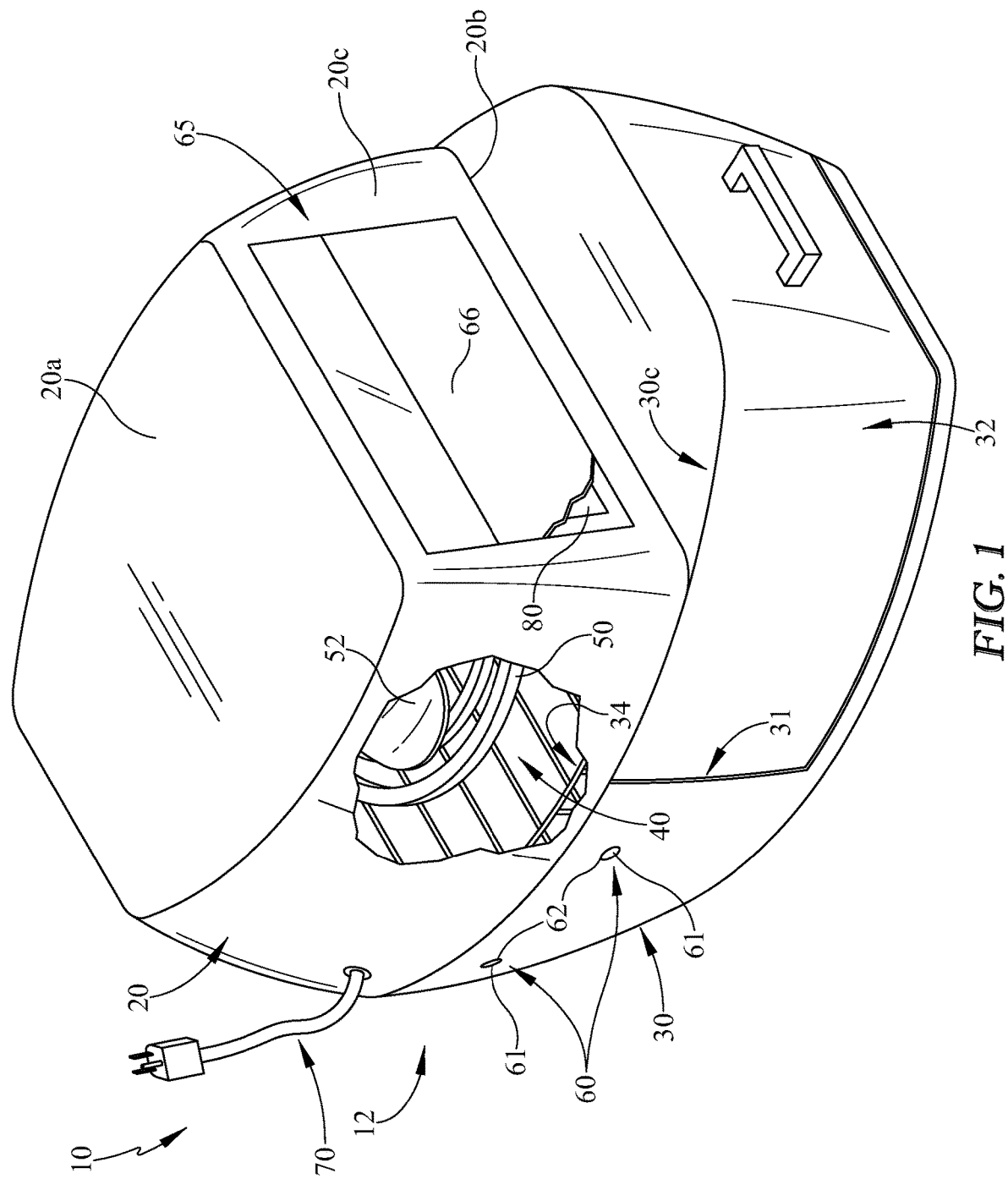
FIG. 1 is a perspective view of one embodiment of an air fryer cooking appliance illustrating the upper body and the lower body in the deployed position.
Figure 2:
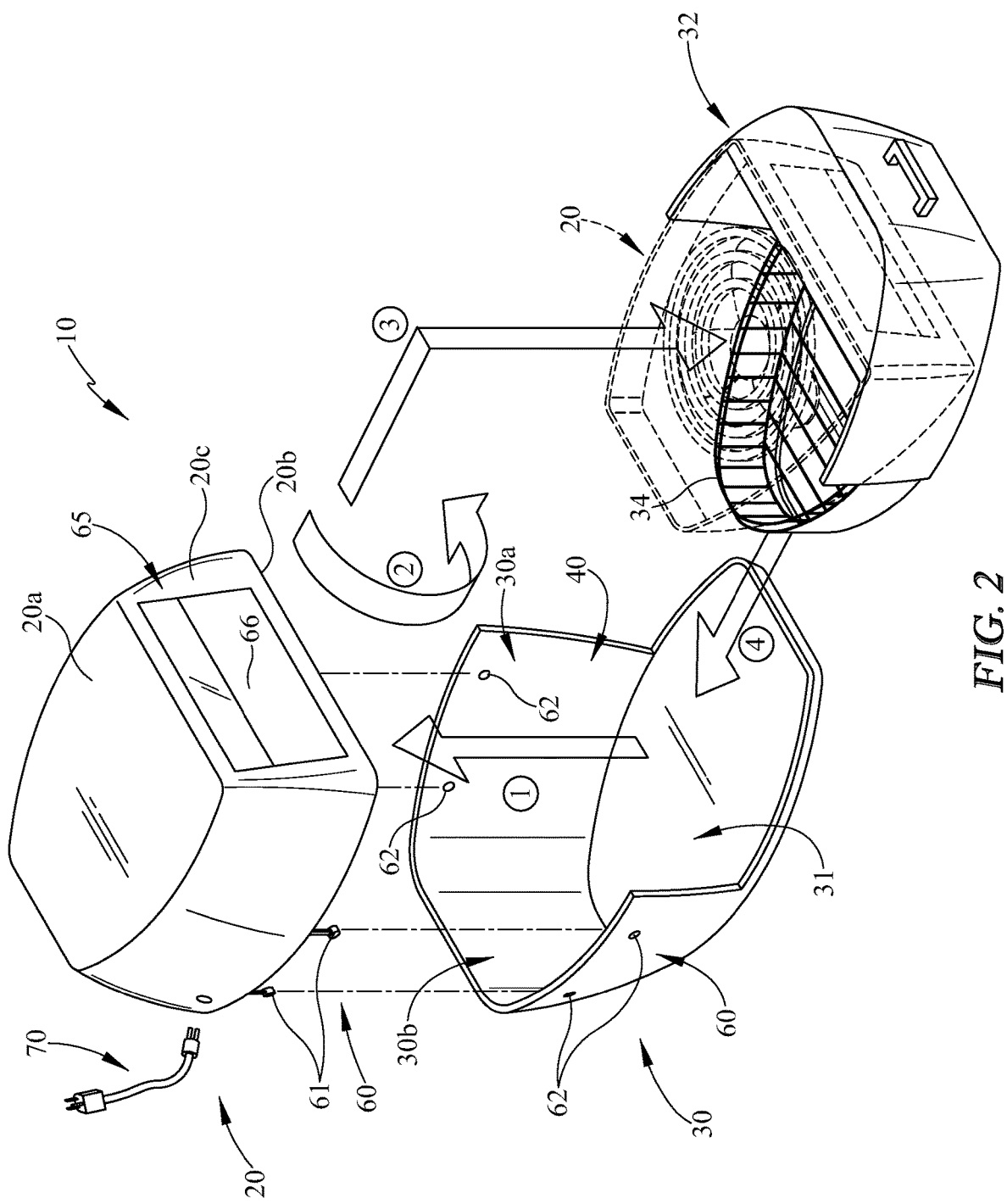
FIG. 2 is an exploded view of the air fryer cooking appliance of FIG. 1.
Figure 3:
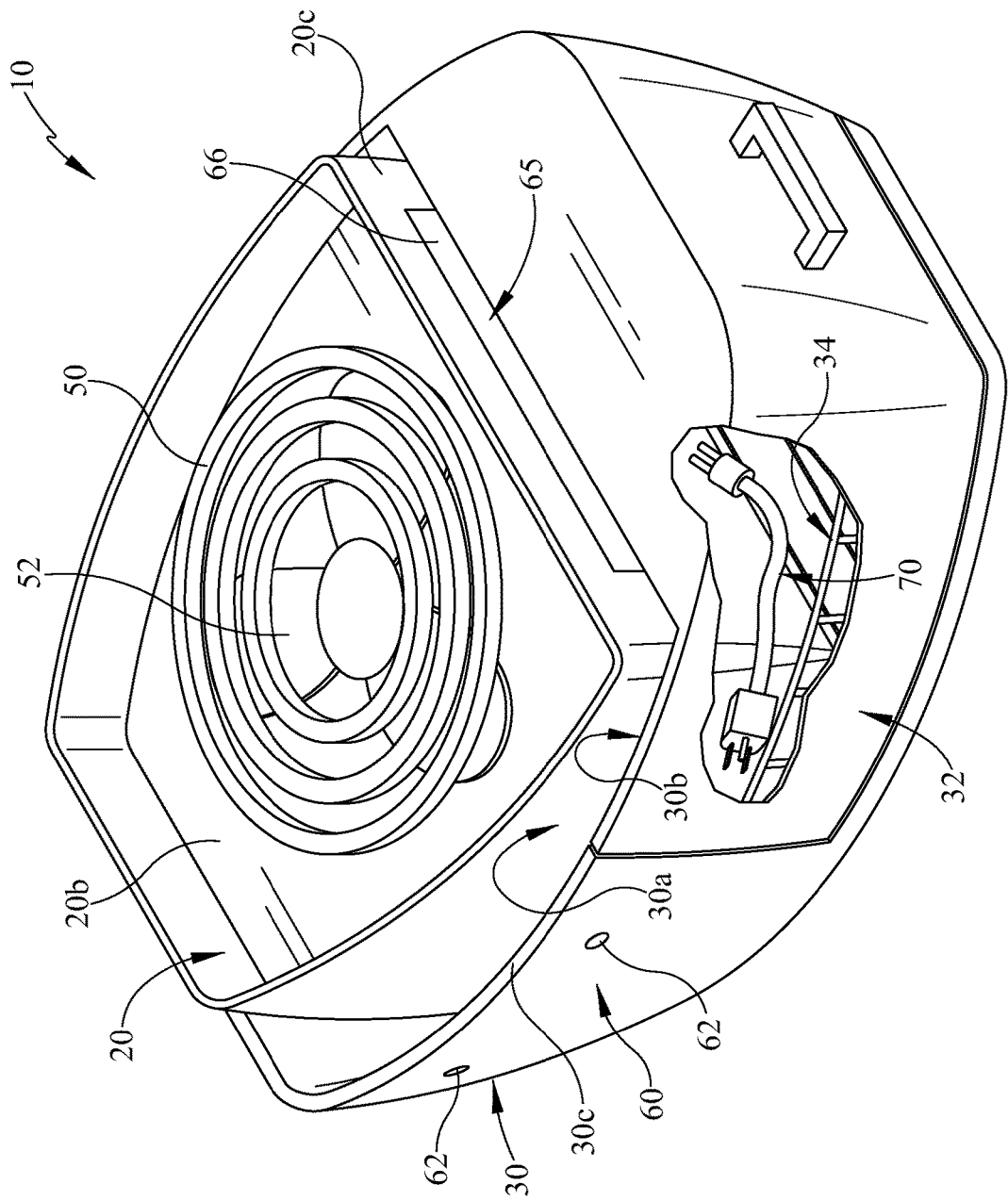
FIG. 3 is a perspective view of the embodiment of FIG. 1 illustrating the upper body and the lower body in the stowed position.
Figure 4:
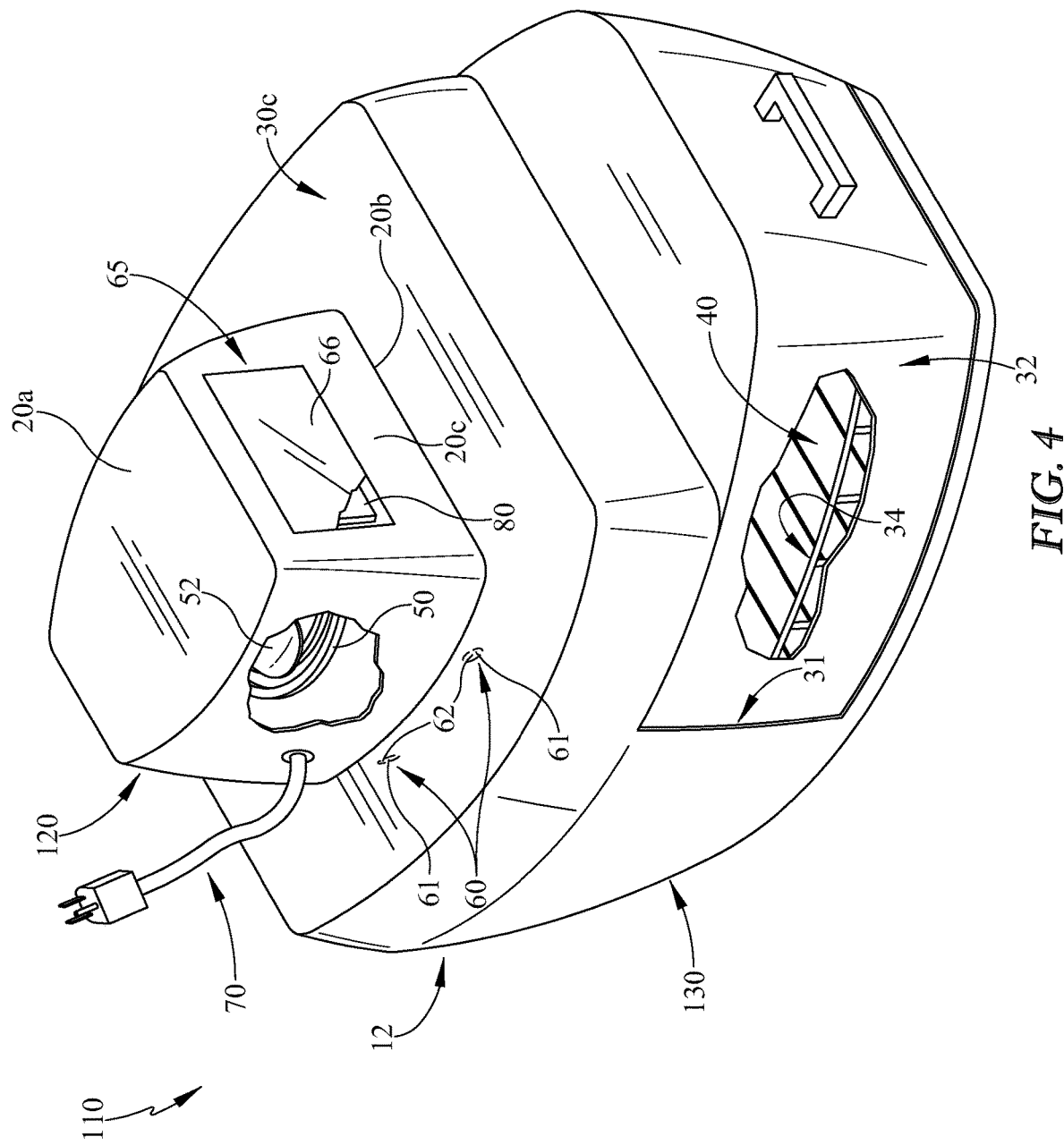
FIG. 4 is a perspective view of another embodiment of an air fryer cooking appliance illustrating the upper body and the lower body in the deployed position.
Figure 5:
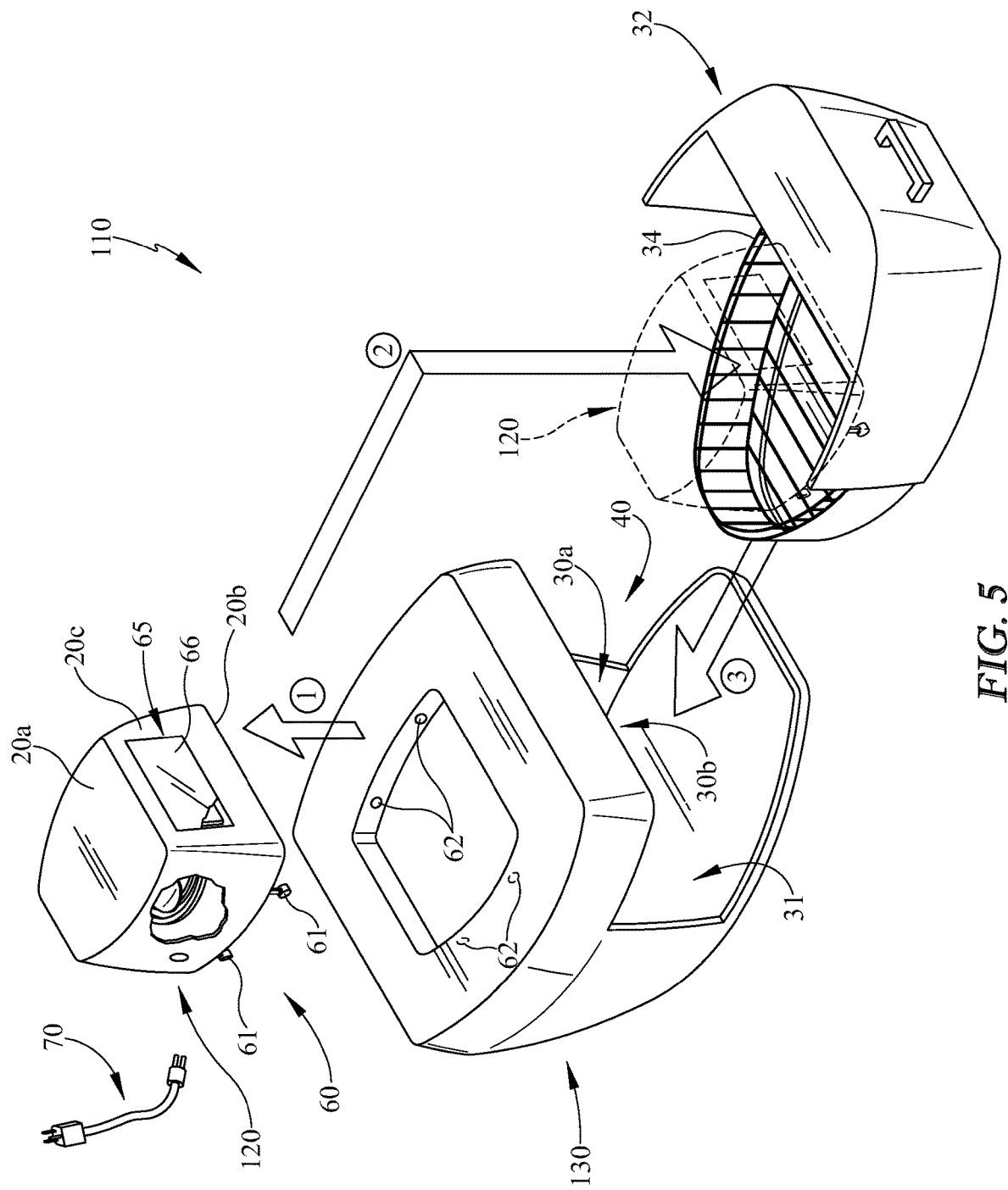
FIG. 5 is an exploded view of the air fryer cooking appliance of FIG. 4.
Figure 6:
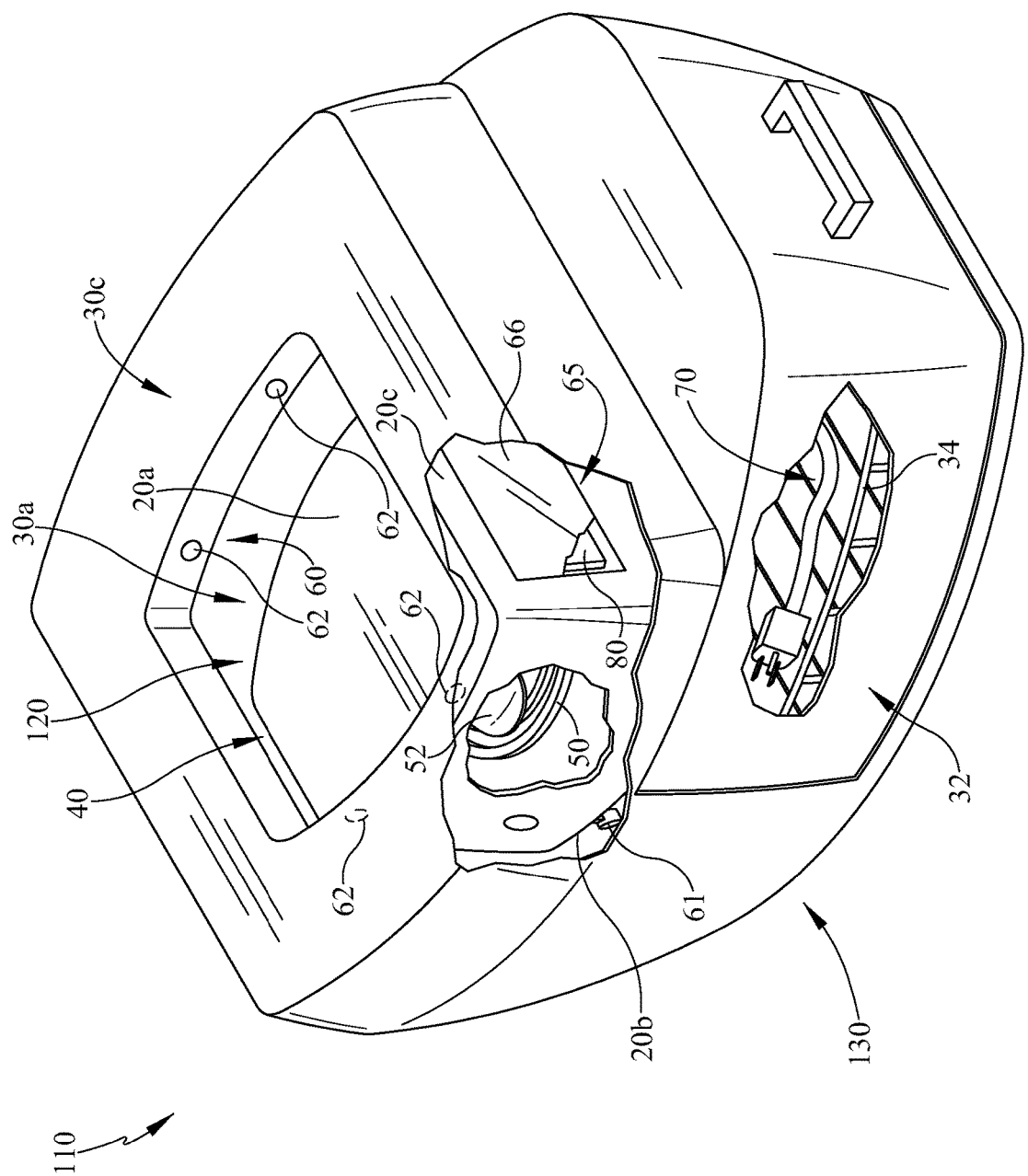
FIG. 6 is a perspective view of the embodiment of FIG. 4 illustrating the upper body and the lower body in the stowed position.

Turning now to the drawings, wherein like numbers denote like parts throughout the several views, FIGS. 1-6 illustrate an example air fryer cooking appliance 10, 110 in which the various technologies and techniques described herein may be implemented. The air fryer cooking appliance 10, 110 may efficiently utilize a given space and provides for convenient storage, shipping, handling, operating, etc. The air fryer cooking appliance 10, 110 includes portions/members (e.g. upper body, lower body) of the housing 12 in a nesting engagement/relationship with each other. The housing 12 of the air fryer cooking appliance 10, 110 includes an upper member or body 20, 120, or portions thereof, in a nesting engagement/relationship with a lower member or body 30, 130, or portions thereof. In the stowed position as shown in FIGS. 3 and 6, the upper body 20, 120 may be at least partially nested within the volume 30a or inner periphery 30b (e.g. one or more inner surfaces, top, bottom, side walls, etc.) of the lower body 30, 130. When nested or stowed (FIGS. 3 and 6) the overall volume/shape/size (e.g. height) is minimized as compared to the deployed position (FIGS. 1 and 4) out of the nested or stowed position (FIGS. 3 and 6). The upper body 20, 120, or portions thereof, may be inserted (e.g. vertical, telescoped, slid, rotated, pivoted, laterally, etc.) into and/or out of the volume 30a or portions defined by the lower body 30, 130, or portions thereof (e.g. drawer, basket, container). The upper body 20, 120 may be positionable (e.g. telescoped, inserted, inverted) between the stowed position (FIGS. 3 and 6) with the lower body 30, 130 and the deployed position (FIGS. 1 and 4). In the stowed position as shown in FIGS. 3 and 6, the one or more outer extent dimension (e.g. the overall height and/or other dimensions) of the appliance 10, 110 may be reduced and at least a portion of the lower body 30, 130 (e.g. volume, housing, drawer, basket, or interior) may be occupied by at least a portion of the upper body 20, 120. In the deployed position as shown in FIGS. 1 and 4, the upper body 20, 120 may project away from, stack upon, and/or engage the lower body 30, 130 (e.g. upper end). In some embodiments, the overall height of the air fryer cooking appliance may be reduced from the deployed position to the stowed position. The air fryer cooking appliance, or portions thereof, may be a variety of shapes, sizes, quantities, and constructions and still be within the scope of the invention.

In some implementations, the upper body 20, 120 is configurable between the stowed position and the deployed position relative to the lower body 30, 130. In at least the deployed position the air fryer cooking appliance 10, 110 may operate. When in the deployed position the heating device 50 and the air circulating device 52 is in communication with the food container 32 to circulate heated air within the food container 32 of the lower body 30. When in the stowed position the upper body 20, 120 is positioned in a portion of the volume 30a of the food container 32. For example, as shown in the Figures, the air fryer cooking appliance 10, 110 may operate or be operable in the deployed position and may be inoperable or not operate in the stowed position. Alternatively, in other embodiments, the air fryer cooking appliance may operate in both the stowed and the deployed positions.

In some implementations, the upper body 20, 120 and the lower body 30, 130 may define at least a portion of the heating compartment 40. When in the operating or deployed position, the upper body and lower body may define the heating compartment. The lower body 30, 130 may include the food container 32 (e.g. drawer). As shown in the Figures, the food container 32 may be a drawer. The heating compartment 40 may be defined by a portion of the food container 32 or portions thereof, remaining portion of the lower body 30, 130, and/or upper body 20, 120 when in the deployed position. At least a portion of the food container 32 may be positioned within the heating compartment 40, such that food contents within the food container may be in communication with the air and/or the heat. When in the stowed position, as shown in FIGS. 3 and 6, the upper body 20, 120 may be positioned in at least a portion of the heating compartment 40, food container 32, and/or lower body 30, or portions thereof. The upper body 20, 120 may be positioned in at least in a portion or volume 30a of the food container 32 (e.g. drawer) of the lower body 30, 130 or heating compartment 40 when in the stowed position. The food container 32 (e.g. food drawer) may include a basket 34. When in the stowed position, the upper body 20, 120, or portions thereof, may be positioned within the volume 30a or a portion of the basket 34 of the food container.

In some implementations, the upper body 20, 120 may be in a variety of orientations when in the stowed position and/or the deployed position. The upper body 120 may be in the same orientation in both the stowed position and the deployed position as shown in the one embodiment in FIGS. 4-6. Alternatively, the upper body 20 may be in one orientation in the deployed position and another/different orientation in the stowed position as shown in FIGS. 1-3. As shown in FIGS. 1-3, the upper body 20 is at least inverted and positioned within the lower body 30. For example, the upper end 20a of the upper body 20 is stowed downwardly into the lower body 30 and the lower end 20b is positioned upwardly. As shown in the embodiments in the Figures, the front facing end 20c remains facing forward in both the deployed and stowed positions. However, although not shown, the front facing end 20c may be oriented to face towards the back of the appliance. As shown in FIGS. 5 and 6, the upper body 120 is not inverted when in stowed position. The upper body 120 remains in the same orientation in the stowed and deployed positions. For example, the upper end 20a of the upper body 120 is stowed upwardly and the lower end 20b is positioned downwardly into the lower body 130. The air fryer cooking appliance 10, 110 may increase in overall height when in the deployed position and may decrease in overall height when in the stowed position. In some embodiments as shown in FIG. 5, the upper body 20 may extend above the upper end or upper extent 30c of the lower body 30, or portions thereof, when in the stowed position. In various embodiments as shown in FIG. 6, the upper body 120 may extend below the upper end or upper extent 30c of the lower body 130, or portions thereof, when in the stowed position. In some embodiments, the food container or drawer 32 may be in the closed position (FIGS. 3 and 6) when the air fryer cooking appliance is in the stowed position. However, the drawer or container may be in the open position, different from the closed position, when in the stowed position.

In some implementations, assembling the upper body 20, 120 into and/or out of the volume 30a of the lower body 30, 130, or portions thereof, may include the food container 32 being in one or more positions. The food container 32 may be moveable between a closed position and one or more open positions different from the closed position. As shown in the Figures, the food container 32 may be in the open position (FIGS. 2 and 5) to receive the upper body 20, 120, or portions thereof. With the food drawer or container 32 in the open position, the upper body 20, 120 may be inserted into the volume 30a of the container 32, or portions thereof, then subsequently moved (e.g. slid) into the closed position (FIGS. 1, 3, 4, and 6) of the food container or the stowed position of the air fryer cooking appliance. Correspondingly, in some embodiments as shown in the Figures, when the food drawer or container is moved from the closed or stowed position to the open position, the upper body 20, 120 may be removed from the food container 32 or lower body 30, 130. In some embodiments, the upper body may be inserted into and removed from the volume of the food drawer or container only when in the food drawer or container is in the open position. In some embodiments, the drawer or container may be in the closed position and still receive or insert the upper body and/or remove the upper body, or portions thereof.

In some implementations, the air fryer cooking apparatus 10, 110 may include one or more locking mechanisms 60. The locking mechanism 60, if used, may releasably secure the upper body 20, 120 to the lower body 30, 130 when in the deployed position. When locked or engaged, the locking mechanism 60 may interfere with or releasably fix/secure the relative movement between the upper body 20, 120 and the lower body 30, 130 in one or more directions when in the deployed position. When unlocked or disengaged, the upper body 20, 120 may be separated then orientated to the appropriate position to assemble with the lower body 30, 130 in the stowed position. In the one embodiment shown in the Figures, the locking mechanism 60 may be one or more spring loaded clips 61 projecting from the upper body 20, 120 and engaging/locking one or more openings or catches 62 in the lower body 30, 130 when in the deployed position. Releasing the clips 61 from the openings 62 allows for separation out of the deployed position and subsequent placement with the lower body in the stowed position. The locking mechanism 60, or portions thereof, may be a variety of shapes, sizes, quantities, and constructions and still be within the scope of the invention. For example, a locking mechanism may be used to secure the upper body with the lower body in the stowed position in some embodiments. Snaps, clips, or other types of fasteners may be used in some embodiments.

In some embodiments, the air fryer cooking appliance may include a power cord 70 that may be removable from the housing. The removable power cord, if used, may be stored in the lower body 30, 130 (e.g. food container) in the stowed position. In some embodiments, the power cord may not be removable.

The air fryer cooking appliance 10 may selectively utilize air frying components for cooking food contents/product that are placed in a food container 32. Control over cooking appliance 10, 110 by a user is generally managed through a control panel 65 typically disposed on a top or front of the housing 12, or portions thereof, and it will be appreciated that in different appliance designs, the control panel 65 may include various types of user interfaces 66 including various input and/or output devices, including various knobs, buttons, lights, switches, textual and/or graphical displays, touch screens, etc. through which a user may configure one or more settings and start and/or stop the air fry cycle.

In some implementations, the housing 12 may include the upper body and/or the lower body (e.g. food container) defining at least one heating compartment 40. As shown in the one embodiment in the Figures, the upper body 20, 120 may include at least the heating device 50 and the air circulating device 52 (e.g. fan). In some embodiments, the upper body 20, 120 may include the controls 65, user interface 66, and/or controller 80. The lower body 30, 130 may include the food container 32 (e.g. drawer). The housing 12 or heating compartment 40 may include an opening 31 removably receiving the food container 32. The upper body 20, 120 and the lower body 30, 130 may define the opening 31. In some embodiments, the lower body 30, 130 may define the opening. The containers or drawers 32 may include rails or slides allowing the container/drawer to be accessible and/or removed. The container 32 is configured between an open or deployed position (FIGS. 2 and 5) for the loading and unloading of the food product, and a closed, stowed, or operating position (FIGS. 1, 3, 4, and 6) when engaged/sealed with the housing 12 or lower body, etc. (FIGS. 1 and 2). In the open position, the container or drawer 32 may be detached or remain attached to the remainder of the housing 12 or lower body 30; 130 and still unload/load the food contents. The food containers or drawers 32 may be deployed from the closed position towards another position (e.g. open position). It should be understood that housing may be a variety of constructions, quantities of reconfigurable members/bodies, shapes, and sizes and still be within the scope of the invention. For example, in some embodiments, a lower body, a middle body, and an upper body may be configured between the stowed and deployed positions. Further, the upper body and/or lower body may include a variety of components and still be within the scope of the invention.

In some implementations, the food container 32 may be a drawer as shown in the one embodiment. In some embodiments, the container 32 may include a mesh container or basket 34 having an inner area or volume 30a that is sufficiently large to hold a specified quantity of food. The mesh basket 34, if used, within the drawer 32, may be relatively dense or loose, depending on the desired amount of access to air and/or heat that is desired within the basket itself. As shown more clearly in FIG. 2, the food container 32 may include a wire basket 34, if used. The basket 34, if used, may be made of materials other than mesh, such as a solid material sheet with perforations, for example, or other materials.

In some embodiments, the appliance 10 or one or more heating compartments 40 may include one or more heating devices 50 in communication therewith. As shown in the one embodiment, the heating compartment 40 includes one or more heating devices 50. The heating compartment 40 may include a heating device 50 in communication with the food container 32. The circulating device 52 (e.g. motor, fan, etc.) may operate with the heating device 50 to communicate with the food container 32 or compartment 40 to heat the contents of the food container by circulating air (e.g. hot air).

The heating device 50 may be a variety of positions within the housing and/or upper body 20, 120, quantities, shapes, sizes, and constructions. The heating device 50 may include quartz tube heaters, wound mica heaters, halogen tube heaters, or other types of heaters (e.g. tubular heaters), such as those commercially available under the trade name "Calrod," for example. In the one embodiment shown, the heating device may be an electric heater that is used to produce radiant heat within the housing.

In some implementations, one or more circulating devices 52 may be used to circulate air. The air may be circulated with and/or without one or more heating devices 50 heating or producing heat. The circulating device 52 may circulate air to and/or from one or more heating compartments 40 and/or food containers 32. In some embodiments as shown in the Figures, one or more fans 52 (e.g. a centrifugal fan) are provided generally adjacent to the heating device 50 to circulate the air (e.g. heated) through the housing 12 and into the heating compartment 40 or food container 32. The one or more circulating devices 52 may circulate air (e.g. heated) to and/or from the food container 32 or heating compartment 40 to air fry the contents therein.

In some implementations as shown in FIGS. 1 and 4, cooking appliance 10 (e.g. upper body) may be under the control of a controller 80 that receives inputs from a number of components and drives a number of components in response thereto. Controller may for example, include one or more processors and a memory (not shown) within which may be stored program code for execution by the one or more processors. The memory may be embedded in the controller, but may also be considered to include volatile and/or non-volatile memories, cache memories, flash memories, programmable read-only memories, read-only memories, etc., as well as memory storage physically located elsewhere from controller, e.g., in a mass storage device or on a remote computer interfaced with controller.

The controller 80 may be coupled to the heating device 50 and the circulating device 52, or portions of the cooking appliance 10, 110, to circulate air (e.g. hot air) to the contents within the food container 32/heating compartment 40 for one or more air fryer cycles.

Moreover, controller 80 may be coupled to the user interface 66 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 80 may also be coupled to one or more network interfaces, e.g., for interfacing with external devices via wired and/or wireless networks such as Ethernet, Bluetooth, NFC, cellular and other suitable networks.

Moreover, in some embodiments, at least a portion of controller 80 may be implemented externally from the cooking appliance, e.g., within a mobile device, a cloud computing environment, etc., such that at least a portion of the functionality described herein is implemented within the portion of the controller that is externally implemented. In some embodiments, controller may operate under the control of an operating system and may execute or otherwise rely upon various computer software applications, components, programs, objects, modules, data structures, etc. In addition, controller may also incorporate hardware logic to implement some or all of the functionality disclosed herein. Further, in some embodiments, the sequences of operations performed by controller to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

In use, in some implementations, the air fryer cooking appliance may be removed from storage (e.g. cabinet) in the kitchen and positioned on a counter-top or working surface. The user may remove the upper body 20, 120 from the stowed position within the portion of the volume 30a of the food container 32 (e.g. drawer, basket). If needed, the food container or drawer 32 may be positioned away from the stowed or closed position to another or open position to remove the upper body 20, 120. If needed, the upper body 20, 120 may be reoriented (e.g. inverted) from one orientation (e.g. first orientation) in the stowed position to another/different orientation (e.g. second orientation) to be placed in the deployed position with the lower body 30, 130. The user may then couple the upper body 20, 120 to the lower body 30, 130 in the operating or deployed position. The coupling of the upper body 20, 120 and the lower body 30, 130 may include locking the two or more components by engaging the locking mechanism 60, if used. The removable power cord 70, if used, may be connected to the housing 12 (e.g.

upper body or lower body). A food product, if desired to be cooked (e.g. air frying), may be positioned or placed into the air fryer or food container 32 (e.g. drawer, basket) when in the open position and subsequently positioned to the closed position within the housing 12. The user may then turn on and/or off the air fryer cycle/function (e.g. control, user interface, controller, etc.). The food product may be cooked by the heated and/or circulated air. When the user is finished using the air frying cooking appliance 10, 110, the user may decouple the upper body 20, 120 from the lower body 30, 130 from the deployed position. The decoupling may include unlocking the two or more components by disengaging the locking mechanism 60, if used. The removable power cord 70, if used, may be removed from the housing 12 and stored in the lower body 30, 130 (e.g. volume). The user may then insert the upper body 20, 120 into the portion of the volume 30a of the lower body 30, 130 (e.g. food drawer) to the stowed position. If needed, the food container or drawer 32 may be positioned in the open position to insert the upper body 20, 120 into the portion of the volume 30a of the food container. If needed, the upper body 20, 120 may be reoriented (e.g. inverted) from one orientation in the deployed position to another/different orientation to be placed in the stowed position with the lower body 30, 130. The user may subsequently close the food drawer 32 to the stowed or closed position, if needed. To store the appliance 10, 110, the user may then return the cooking appliance in the stowed position into the storage location (e.g. cabinet).

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. An air fryer cooking appliance comprising:
   a housing having an upper body and a lower body;
   wherein the lower body includes a food container having a volume therein, and wherein the food container is movable between a closed position and an open position different from the closed position relative to a remaining portion of the lower body;
   wherein the upper body includes a heating device and an air circulating device; and
   wherein the upper body, the heating device, and the air circulating device are is configurable between a stowed position and a deployed position relative to the lower body, when in the deployed position the heating device and the air circulating device is in communication with the food container to circulate heated air within the food container of the lower body, and when in the stowed position the upper body, the heating device and the air circulating device are positioned in a portion of the volume of the food container of the lower body and a lateral gap is defined between an outer perimeter of the upper body and an inner perimeter of the lower body; and
   a locking mechanism, wherein the locking mechanism releasably secures the upper body having the heating device and the circulating device to the lower body when in the deployed position while still allowing the food container to move between the closed position and the open position relative to the remaining portion of the lower body and the upper body to load/unload food contents within the food container when in the open position.

2. The air fryer cooking appliance of claim 1 wherein when in the deployed position both the upper body and the lower body define a heating compartment, wherein the food container is positioned in the heating compartment.

3. The air fryer cooking appliance of claim 1 wherein when in the stowed position the upper body is inverted in a second orientation, relative to a first orientation in the deployed position, within the volume of the food container, and an upper end of the upper body is positioned against a wire basket.

4. The air fryer cooking appliance of claim 1 wherein the upper body is in a first orientation when in both the deployed position and the stowed position within the volume of the food container.

5. The air fryer cooking appliance of claim 1 wherein the locking mechanism is engaged when the upper body is in the deployed position and is disengaged when the upper body is in the stowed position.

6. The air fryer cooking appliance of claim 1 wherein the food container includes a drawer with a basket therein, when in the stowed position the upper body is positioned within the volume of the basket of the food container of the lower body.

7. The air fryer cooking appliance of claim 1 wherein the food container is in a single orientation in both the closed position and the open position when the upper body, the heating device, and the air circulating device are is in both the deployed position and the stowed position.

8. The air fryer cooking appliance of claim 1 wherein the locking mechanism includes one or more clips of the upper body engaging one or more openings of the lower body.

9. The air fryer cooking appliance of claim 1 further comprising a power cord extending from the upper body or the lower body, wherein the power cord is positioned in the portion of the volume of the food container of the lower body when in the stowed position.

10. The air fryer cooking appliance of claim 1 wherein the outer perimeter of the upper body is different in size than the inner perimeter of the lower body when in the stowed position and wherein the lateral gap varies in shape between the outer perimeter of the upper body and the inner perimeter of the lower body when in the stowed position.

11. An air fryer cooking appliance comprising:
    a housing having an upper body and a lower body, wherein the lower body includes a volume therein;
    wherein the lower body includes a food drawer with a basket therein, wherein the food drawer is movable between a closed position and an open position different from the closed position relative to a remaining portion of the lower body, wherein the upper body includes a heating device and an air circulating device, and wherein when the food drawer is in the open position food contents are unloaded/loaded into the food drawer of the lower body and when the food drawer is in the closed position the heating device and the air circulating device is in communication with the food drawer to circulate heated air within the food drawer of the lower body; and
    wherein the upper body, the heating device, and the air circulating device are configurable between a stowed position and a deployed position relative to the food drawer, when in the deployed position the heating device and the air circulating device is in communication with the food drawer to circulate heated air within the food drawer of the lower body, and when in the stowed position the upper body, the heating device, and the air circulating device are positioned in a portion of the volume of the food drawer of the lower body, the heating device and the air circulating device are not in communication with the food drawer to circulate heated air within the food drawer of the lower body and wherein a lateral gap is defined between an outer perimeter of the upper body and an inner perimeter of the lower body when in the stowed position.

12. The air fryer cooking appliance of claim 11 wherein the outer perimeter of the upper body is different in size than the inner perimeter of the lower body when in the stowed position.

13. The air fryer cooking appliance of claim 11 further comprises a locking mechanism, wherein the locking mechanism releasably secures the upper body to the lower body in the deployed position, and wherein the locking mechanism is engaged when the upper body is in the deployed position and is disengaged when the upper body is in the stowed position.

14. The air fryer cooking appliance of claim 11 wherein when in the deployed position both the upper body and the lower body define a heating compartment, wherein the food drawer is positioned in the heating compartment.

15. The air fryer cooking appliance of claim 11 wherein when in the stowed position the upper body is inverted in a second orientation, relative to a first orientation in the deployed position, within the volume of the food drawer.

16. The air fryer cooking appliance of claim 11 wherein the upper body is in a first orientation when in both the deployed position and the stowed position within the volume of the food drawer.

17. The air fryer cooking appliance of claim 11 wherein the appliance is operable in the deployed position and inoperable in the stowed position.

18. The air fryer cooking appliance of claim 11 wherein the upper body is inserted into the volume of the food drawer only when the food drawer is in the open position.

19. A method of operating an air fryer cooking appliance comprising the steps of:

providing a housing having an upper body and a lower body, wherein the lower body includes a drawer having a volume therein, and wherein the drawer is slidable between a closed position and an open position different from the closed position relative to a remaining portion of the lower body, wherein the upper body includes a heating device and an air circulating device;

removing the upper body, the heating device, and the air circulating device from a stowed position within a portion of the volume of the drawer of the lower body;

coupling the upper body, the heating device, and the air circulating device to the lower body in a deployed position different from the stowed position;

circulating air and heat to the drawer in the closed position after coupling the upper body having the heating device and the air circulating device to the lower body in the deployed position;

inverting the upper body, the heating device and the air circulating device from one orientation in the deployed position to another orientation in the stowed position; and when in the deployed position decoupling the upper body, the heating device, and the air circulating device from the lower body and inserting the upper body, the heating device, and the air circulating device into the portion of the volume of the drawer wherein a lateral gap is created between a perimeter of the upper body and a perimeter of the lower body when in the stowed position.

20. The method of claim 19 further including the step of positioning the drawer in the open position before inserting the upper body, the heating device, and the air circulating device into the drawer or removing the upper body, the heating device, and the air circulating device from the drawer.

21. The method of claim 16 wherein the drawer is in the closed position when the upper body and the lower body are in the stowed position.

22. The method of claim 19 wherein the step of coupling further includes locking the upper body to the lower body in the deployed position.

* * * * *